(12) United States Patent
Taranowski et al.

(10) Patent No.: US 6,259,372 B1
(45) Date of Patent: Jul. 10, 2001

(54) SELF-POWERED WIRELESS TRANSDUCER

(75) Inventors: Michael G. Taranowski, Greendale; David L. McClanahan, Greenfield, both of WI (US); David S. Totten, Farmington Hills, MI (US); James J. Kinsella, Mequon, WI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/235,212

(22) Filed: Jan. 22, 1999

(51) Int. Cl.[7] .................................................. G08B 21/00
(52) U.S. Cl. ......................... 340/683; 340/539; 340/679; 340/691.1
(58) Field of Search .................................... 340/683, 679, 340/680, 682, 691.1, 691.6, 692, 691.7, 539, 540, 566

(56) References Cited

U.S. PATENT DOCUMENTS

| | | | |
|---|---|---|---|
| 4,237,454 | * 12/1980 | Meyer | 340/682 |
| 4,581,572 | * 4/1986 | Yoshiyuki et al. | 320/67 |
| 4,630,465 | * 12/1986 | Hatton | 73/35 |
| 4,642,618 | * 2/1987 | Johnson et al. | 340/683 |
| 5,212,421 | * 5/1993 | Hatton et al. | 310/329 |
| 5,791,494 | * 8/1998 | Meyer | 209/368 |
| 5,854,994 | * 12/1998 | Canada et al. | 702/56 |

* cited by examiner

*Primary Examiner*—Nina Tong
(74) *Attorney, Agent, or Firm*—Timothy J. Ziolkowski

(57) ABSTRACT

A self-powered wireless transducer is disclosed for monitoring external physical conditions, such as excessive vibrations in a bearing. The transducer includes an energy conversion source, such as a piezoelectric sensor to sense the external physical condition and create a power and characteristic signal that is used to power an RF transmitting circuit. A transmitter is provided to transmit signals indicative of the external physical condition, or changes in that physical condition, such as increased vibrations in a bearing to detect bearing faults before a breakdown. In this manner, the monitored machinery can be shutdown in an orderly manner and preventative maintenance can be completed. The self-powered wireless transducer includes an voltage storage device to receive electrical voltage from the piezoelectric sensor and a voltage detector to detect the level of voltage on the voltage storage device. Once the voltage detector detects a level of voltage at a predetermined level, an oscillating transmitting circuit is activated for a brief hysteresis period of the voltage detector. The information transmitted not only includes any fault detection, it also includes an address of the origin of the transmission.

21 Claims, 4 Drawing Sheets

SELF-POWERED WIRELESS TRANSDUCER

BACKGROUND OF THE INVENTION

The present invention relates generally to wireless transducers, and more particularly to the self-powered wireless transducer for monitoring physical conditions in external structure, such as excessive vibrations in a bearing.

In many present day industrial settings, machinery is run 24 hours a day and seven days a week, thereby making it imperative that maintenance be performed at specified intervals and non-orderly shutdowns must be avoided. Any breakdown of such machinery, or a non-orderly shutdown because of a part defect, can result in expensive downtime. One of the largest failure classifications in such industries is motor failure, and motor failure is most commonly associated with internal bearing failures and/or electrical overheating resulting in insulation breakdown and shorting. Many maintenance personnel and plant managers realize that preventive maintenance is a necessity in such applications, and therefore, periodically replace components, such as entire motors in critical areas with new motors, whether or not they actually need replacement. Such regularly scheduled maintenance may very well be more costly than necessary, but most maintenance personnel and plant managers are willing to pay the cost of replacing an adequately functioning motor, rather than take the risk of a non-orderly shutdown during peak production periods.

Therefore, it would be desirable to have a system and method that could monitor such machinery well in advance of a failure so that maintenance can be performed at scheduled downtimes, while at the same time avoiding replacing perfectly good functioning components. Even a system that can predict a non-orderly shutdown within an hour, allows an orderly shutdown to be accomplished in a period of time in which maintenance personnel can be available with the necessary components that need to be replaced.

Further, each machine may have several motors, and each motor may have several bearings that need to be monitored. It would therefore be desirable to also have a system that could not only detect that there is a problem in a bearing, but to also pinpoint which bearing in which motor needs to be replaced.

It would also be desirable to have such a system that is wireless, which not only makes installation easier, it also avoids unnecessary wires in remote locations that are typically hard to get to and do not have existing low voltage wire harnesses to run the wires thereto. Additionally, it would be desirable to have such a system that is self-powered to avoid scheduled battery replacement.

SUMMARY OF THE INVENTION

The present invention provides a method and apparatus that solves the aforementioned problems and provides information about the well being of the machinery being monitored so that predictive or preventive maintenance can be done in an orderly manner.

In accordance with one aspect of the invention, a wireless transducer includes a housing adaptable to monitor an external physical condition, such as vibrations, of an external structure, for example bearings. The wireless transducer includes a self-contained energy conversion source mounted within the housing to sense the external physical condition and create a power and characteristic signal in response to the external physical condition. This signal is used not only to self-power the circuit and the transmitter, it also contains characteristic information of the external condition. A transmitter is mounted in the housing and connected to the energy conversion source to receive the power and characteristic signal and transmit a monitoring signal that is indicative of the external physical condition. The transmitter receives its power solely from the energy conversion source.

In accordance with another aspect of the invention, a fault detection system includes a plurality of the aforementioned self-powered wireless transducers, wherein each of the self-powered wireless transducers transmits a signal having a distinct address so as to identify which transmitter transmitted that particular signal. The fault detection system also includes a receiver and processor to receive each of the distinct transmissions from the plurality of self-powered wireless transducers and differentiate which self-powered wireless transducer produced each distinct transmission so as to determine a location of a fault detection, if one should occur.

In accordance with yet another aspect of the invention, a method of detecting vibration faults is disclosed which includes mounting a housing within a structure to be monitored so as to receive vibratory motion from the structure on at least a portion of the housing and converting power from vibratory motion to electrical energy within the housing as a result of receiving the vibratory motion. The method next includes storing the converted energy at least until the stored energy reaches a predetermined level, then activating an RF transmitter when the stored energy reaches the predetermined level, and then transmitting an RF signal indicative of vibrations in the structure which the housing is mounted in.

Various other features, objects and advantages of the present invention will be made apparent from the following detailed description of the drawings.

BRIEF DESCRIPTION OF THE DRAWINGS

The drawings illustrate the best mode presently contemplated for carrying out the invention.

In the drawings.

DETAILED DESCRIPTION OF THE PREFERRED EMBODIMENT

Figure 1:
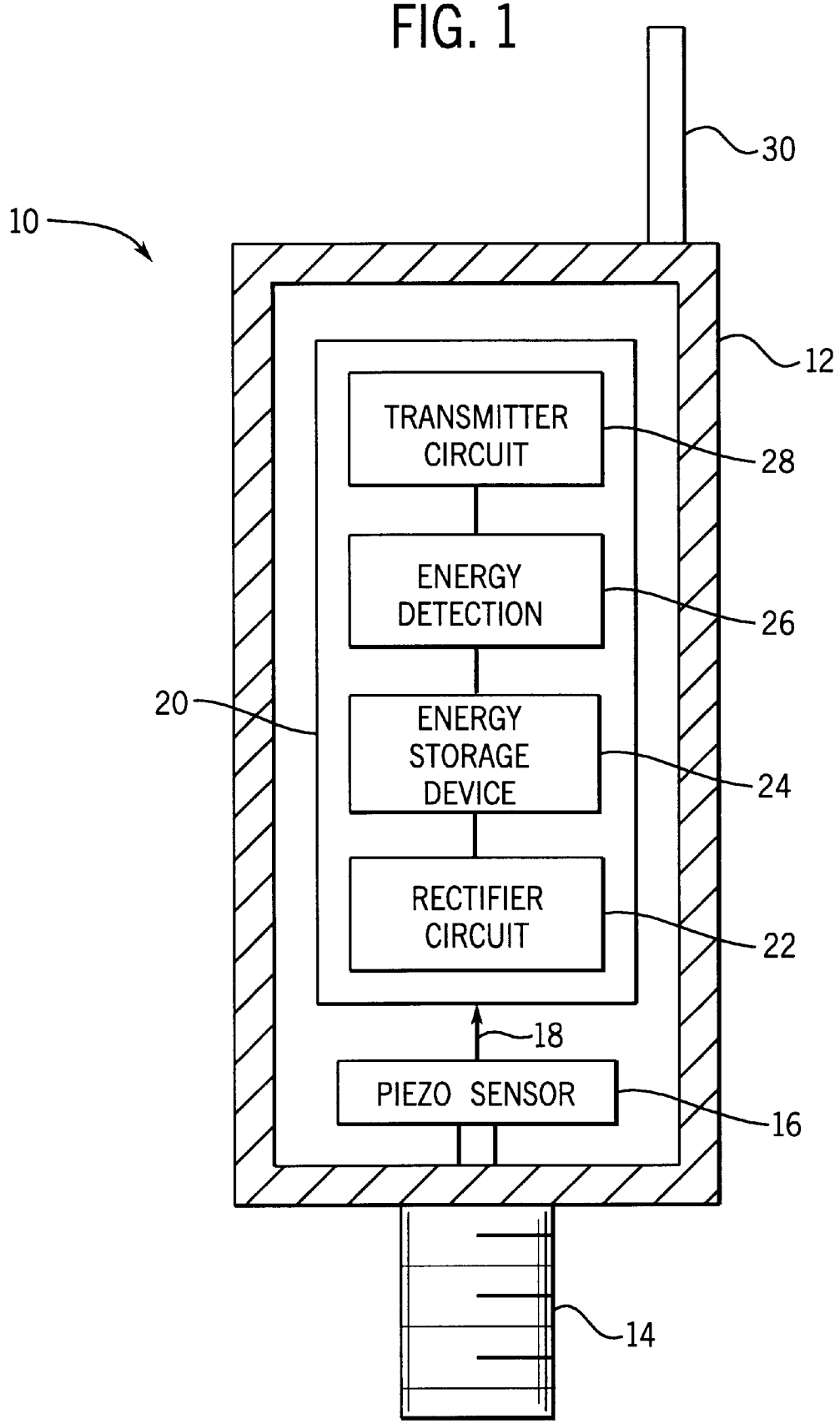
FIG. 1 is a side elevational view of a wireless transducer sectioned to show a block diagram of the internal circuitry of the wireless transducer according to the present invention.

Referring to FIG. 1, a wireless transducer 10 has an exterior housing 12 and, preferably, a threaded shoulder 14 for mounting in a structure (not shown) to be monitored. Examples of such transducer housings are shown in U.S. Pat. Nos. 5,212,421 and 4,630,465, assigned to the Assignee of the present invention, each incorporated herein by reference. Housing 12 is adaptable to monitor an external physical condition in an external structure. One example of such a structure is a bearing housing and one example of the external physical condition to be monitored is vibratory motion in the bearing. The wireless transducer 10 of the present invention can therefore provide information about the well being of a bearing in a machine so that preventive maintenance can be accomplished on the machine before a total failure.

The wireless transducer 10 includes an energy conversion source 16, such as a piezoelectric sensor, mounted within housing 12 to sense the external physical condition, such as vibratory motion, temperature, shock, pressure, flow, or any other physical value. Other types of such parasitic energy conversion sources include solar cells that generate energy as a result of the collection of light, an antenna such as that used in a crystal radio that operates on the collection of RF energy, oscillating kinetic generators that operate on the movement of an external object, or thermal electric generators that operate from the collection of thermal energy.

The energy conversion source 16 creates a power and characteristic signal transmitted on bus 18 in response to the external physical condition. The power and characteristic signal is the sole source of power for the wireless transducer 10 and the circuit 20, and contains a characteristic of the external condition.

The circuit 20 of the wireless transducer 10 includes a rectifier circuit 22 to rectify the power and characteristic signal if that power and characteristic signal is an A.C. voltage signal, such as that from a piezoelectric sensor. The circuit 20 also includes an energy storage device 24 and a energy level detector 26. The energy storage device 24 is connected to the energy conversion source 16 through the rectifier circuit 22 and the energy level detector 26 is connected to the energy storage device 24. The energy storage device 24 is capable of storing the rectified power and characteristic signal at least until the energy level detector 26 detects a predetermined energy level, as will be further described with reference to FIG. 2. The circuit 20 of the wireless transducer 10 of FIG. 1, further includes a transmitter circuit 28 connected to the energy level detector 26 and the energy storage device 24. The transmitter circuit 28 is activated when the energy level detector 26 detects the predetermined energy level, which then activates the transmitter in response thereto to send electromagnetic radiation signals through antenna 30. Although the antenna 30 is shown as an external member of the wireless transducer 10, it is preferable to incorporate the antenna 30 as a trace on the transmitter circuit 28.

Figure 2:
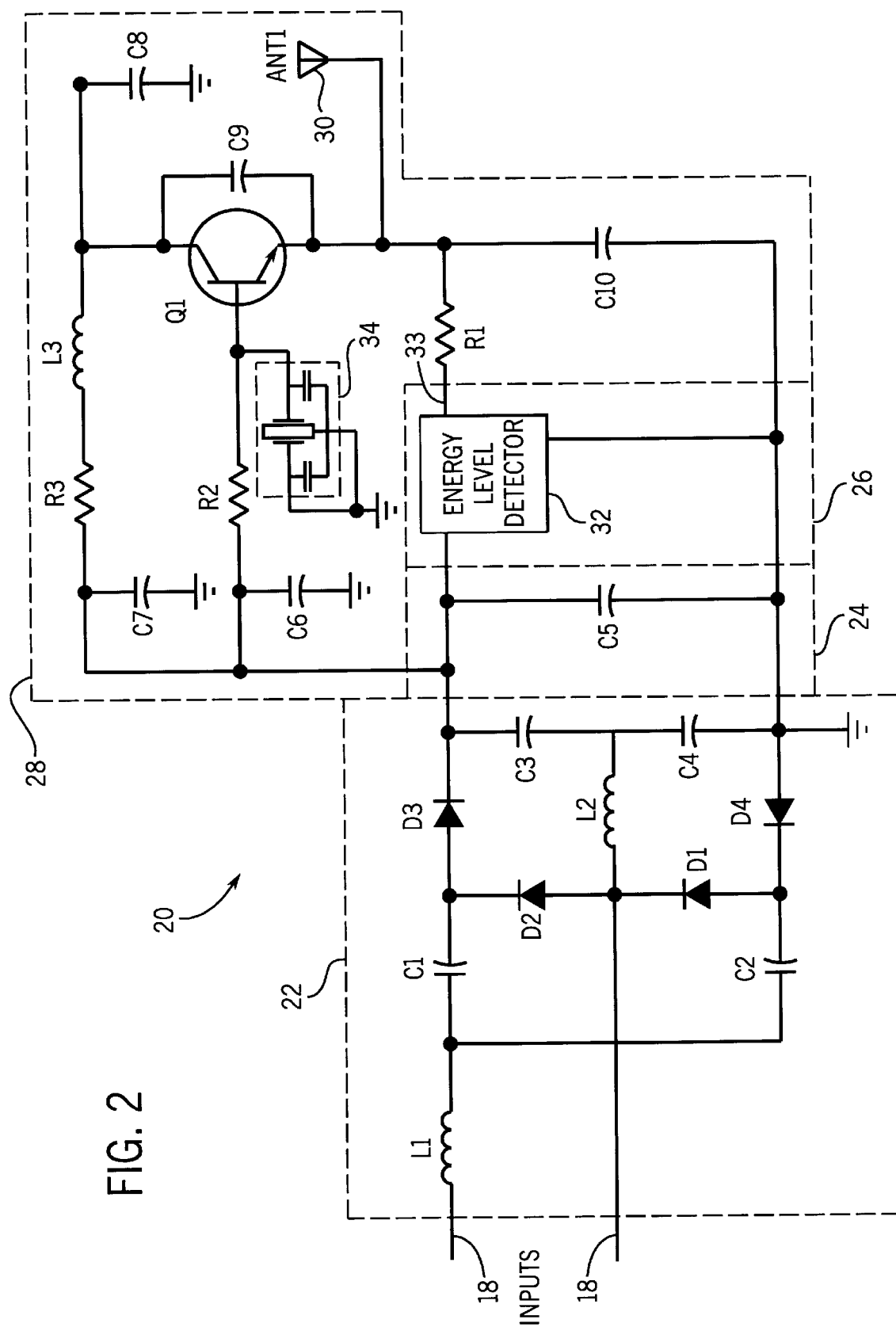
FIG. 2 is circuit schematic of a portion of the block diagram shown in FIG. 1.

Referring to FIG. 2, the circuit 20 for the wireless transducer 10 is shown. The A.C. inputs 18 connect to the rectifier circuit 22 which includes a pair of inductors L1 and L2 for power factor correction and reducing peak currents. A voltage doubling rectifier includes capacitors C1 and C2 and diodes D1–D4. Capacitors C3 and C4 provide filtering, all as is well known. The rectifier circuit 22 is connected to the energy storage device 24 which includes a capacitor C5, the capacitance of which is selected to set a pulse width of the monitoring signal transmitted. In this manner, a number of wireless transducers can be used in close proximity with each having its own address by transmitting a unique monitoring signal. With the other circuit components sized as shown in the table below, the size of capacitor C5 can be varied from a base capacitance of 4.7 $\mu$F.

The wireless transducer circuit 20 also includes a power detection section 26 which includes a voltage comparator or detector 32. In the preferred embodiment, the voltage detector is a Panasonic MN13812C having a built-in hysteresis voltage during which the monitor signal is transmitted. Finally, the wireless transducer circuit 20 also includes a transmitter circuit 28, which main components include a transistor Q1, a resonator 34, and the antenna 30. The resonator 34 is preferably a surface acoustic wave device (SAW) which resonates at a frequency of 916.5 MHZ. Further details on the transmitter circuit can be obtained from RF Monolithics, Inc. Application Notes, Page A-16.

The following component values were found to work adequately in the preferred embodiment:

| Component | Value |
| --- | --- |
| L1, L2 | 10 $\mu$H |
| C1–C4 | 0.1 $\mu$F |
| C5 | 4.7 $\mu$F |
| C6, C7, C8 | 100 pF |
| C9 | 2.2 pF |
| C10 | 100 pF |
| R1, R2 | 10 k$\Omega$ |
| R3 | 10 $\Omega$ |
| L3 | 3.3 nH |
| SAW 34 | RFM RP1285 |
| Q1 | NEC NE85633 |
| voltage Detector 32 | Panasonic MN13812C |

In operation, the circuit 20 rectifies the A.C. inputs 18 from the transducer in the rectifier circuit 20 and charges a low leakage capacitor in the energy storage device 24 until the capacitor voltage reaches a predetermined threshold, approximately 2.1 volts, as determined by the voltage comparator 32. When the detector 32 senses that the predetermined voltage value has been reached, the output 33 of the detector gets pulled low which activates the RF transmitter circuit 28. The transmitter circuit 28 quickly discharges the capacitor C5 such that the output from the transmitter is a short RF burst. The duration of the burst is a function of the capacitance of capacitor C5 and the discharge rate of the transmitter circuit 28. By varying the values of capacitor C5 in different wireless transducer units, the RF burst duration can be used to identify that particular unit. Alternatively, the discharge rate of the transmitter circuit 28 can be modified to change the burst duration.

The hysteresis in the voltage detector 32 is set to approximately 100 mV such that if the predetermined voltage value were set to 2.1 volts, when the output 33 goes low causing the transmitter circuit 28 to begin to oscillate and thus drain capacitor C5, the transmitter circuit 28 continues to transmit until the voltage across capacitor C5 reaches 2.0 volts, at which time the output 33 of the detector 32 goes high, and the capacitor C5 begins to charge up to 2.1 volts and the cycle repeats. While the output 33 of the detector 32 is low, the transmitter circuit 28 transmits at the frequency of the resonator 34, which in the preferred embodiment, is 916.5 MHZ.

Figure 3:
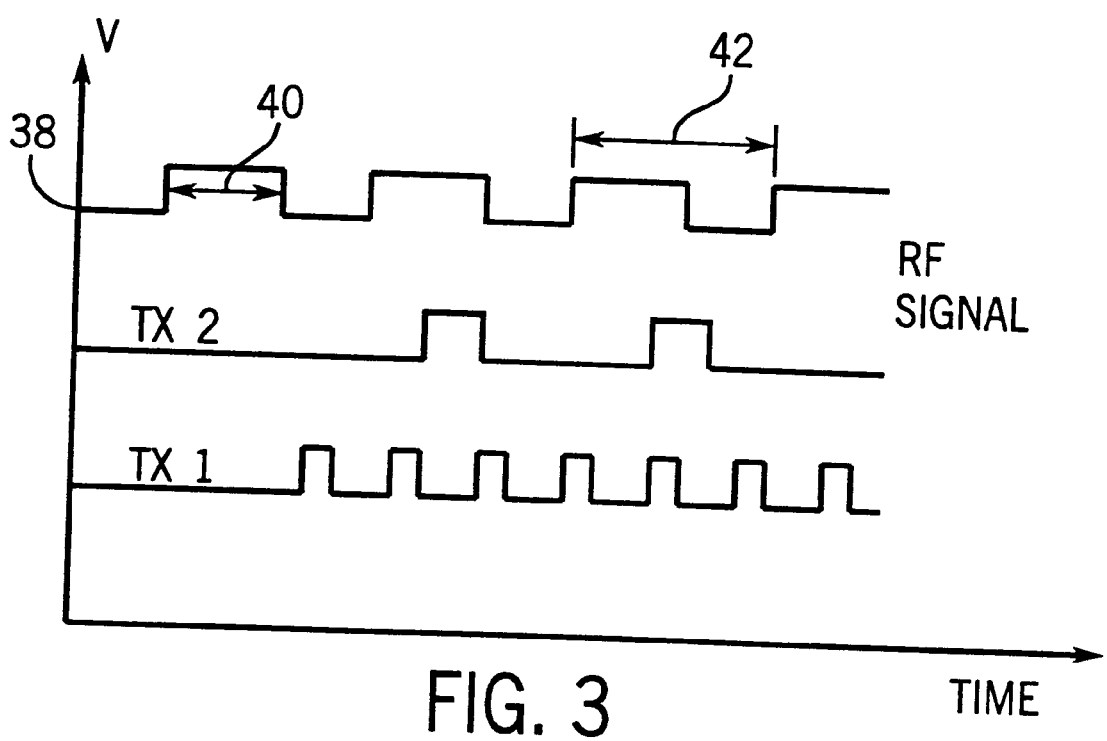
FIG. 3 is a timing diagram depicting RF signals as transmitted by the circuit of FIG. 2.

Referring to FIG. 3, an exemplary RF signal 38 is shown to define the pulse width 40 and the pulse repetition period 42 for an RF signal from any particular transmitter. As indicated by the pulse width of the RF signals TX1 and TX2, each of the transmitters is provided a unique address based on the width of the pulse, which does not change. However, the pulse repetition period changes as the external physical condition changes. For example, in the case of sensing vibratory motion, as the vibrations increase, the pulse repetition period increases. The transmitted signal can then be processed after reception at a remote location.

Figure 4:
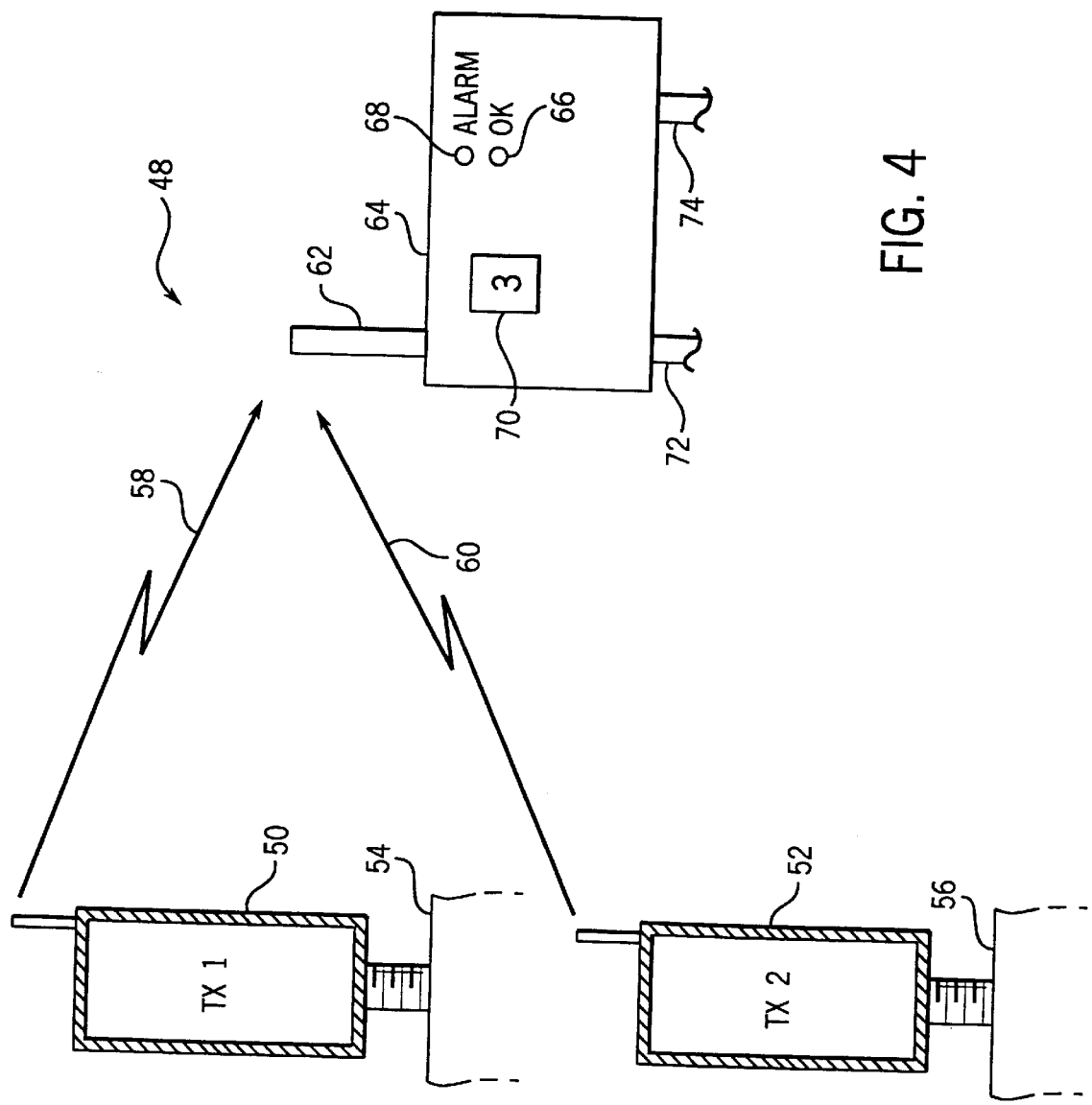
FIG. 4 is a schematic diagram of a fault detection system incorporating the present invention.

Referring to FIG. 4, the wireless transducer of the present invention is incorporated into a fault detection system 48 comprising a number of self-powered wireless transducers 50, 52, each mounted in an external structure 54, 56, respectively. The external structure can be different locations on the same structure, or can be completely different structures such as two different bearings in the same machine, or two different bearings in different machines. The number of different transmitters that can be used is limited only by the precision of the components selected and the amount of processing desired to be done after reception. Each of the self-powered wireless transducers 50, 52 therefore transmit at a distinct frequency 58, 60.

The fault detection system 48 also includes a receiver 62 and a processor 64 to receive each of the distinct frequency transmissions 58, 60, from each of the transmitters 50, 52 and differentiate which self-powered wireless transducer 50, 52 produced each of the distinct frequency transmissions 58, 60 and determine whether any of the transmissions contain a fault detection. In the preferred embodiment, the distinct frequency transmission is the same RF frequency, but it is transmitted at different pulse intervals. If no faults are detected, the processor 64 displays or illuminates a clear or OK indication 66. However, if the processor 64 locates a fault, the processor 64 activates an alarm 68 and provides an indication 70 of which of the self-powered wireless transducers 50, 52 is transmitting the fault detection signal. The processor 64 and receiver 62 receive power via bus 72 and optionally provide an output to a network on bus 74 for centralized display and reporting.

The present invention also includes a method of detecting vibration faults which includes the steps of mounting a housing on a structure to be monitored so as to receive vibratory motion from the structure on at least a portion of the housing and converting vibratory motion within the housing as a result of receiving the vibratory motion into electrical energy. The method next includes storing the converted energy at least until the stored energy reaches a predetermined level, and then activating an RF transmitter when the stored energy reaches the predetermined level. The method next includes transmitting an RF signal indicative of any vibratory faults in the structure which the housing is mounted on.

The step of transmitting the RF signal is further defined as transmitting an RF signal indicative of an RF transmitter's identity such that a receiver and a processor can identify the RF transmitter that transmitted that particular RF signal. The process next includes receiving the RF signal at a remote location and processing the RF signal to determine a change in received vibratory motion in the structure being monitored. Optionally, the method can include displaying an indication of the RF transmitter's identity and activating an alarm to indicate any fault condition found. The process includes comparing past RF signals received to a present RF signal, and if a present RF signal increases in frequency beyond a predetermined limit, then an alarm is activated to indicate that vibratory motion has increased beyond tolerance within the structure and preventative maintenance is required. In the preferred embodiment, the frequencies compared are the pulse repetition period. However, the particular RF frequency may equivalently be modified.

The present invention has been described in terms of the preferred embodiment, and it is recognized that equivalents, alternatives, and modifications, aside from those expressly stated, are possible and within the scope of the appending claims.

What is claimed is:

1. A wireless transducer comprising:

a housing adaptable to monitor an external physical condition of an external structure;

an energy conversion source mounted within the housing to sense the external physical condition and create a power and characteristic signal in response to the external physical condition, the power and characteristic signal having a characteristic of the external condition;

a transmitter mounted in the housing and connected to the energy conversion source to receive the power and characteristic signal and transmit a monitoring signal, the transmitter receiving power only from the energy conversion source as a source of power;

wherein the power and characteristic signal is an A.C. voltage signal and wherein the wireless transducer further comprises a rectifier circuit to rectify the A.C. power and characteristic signal;

an energy storage device and a energy level detector, the energy storage device is connected to the energy conversion source and the energy level detector is connected to the energy storage device, and wherein the energy storage device is capable of storing the rectified A.C. power and characteristic signal at least until the energy level detector detects a predetermined energy level; and wherein the energy storage device is a capacitor, the capacitance of which is selected to set a pulse width of the monitoring signal such that a number of wireless transducers can each produce a unique monitoring signal, and the energy level detector comprises a voltage comparator having a hysteresis in which the monitoring signal is transmitted.

2. The wireless transducer of claim 1 wherein the housing is adapted to sense vibratory movement and the energy conversion source is a piezoelectric sensor which provides the power and characteristic signal.

3. The wireless transducer of claim 1 further comprising a transmitter circuit containing the transmitter and connected to the energy storage device and the energy level detector, the transmitter circuit being activated when the energy level detector detects the predetermined energy level which thus activates the transmitter in response thereto.

4. The wireless transducer of claim 1 wherein the transmitter circuit comprises a transistor and a resonator connected to a base of the transistor to activate the transmitter at a desired frequency.

5. The wireless transducer of claim 1 wherein the transmitter is a radio frequency RF transmitter.

6. The wireless transducer of claim 1 wherein the transmitter circuit drains the energy storage device when activated until energy in the energy storage device falls below the predetermined energy level.

7. The wireless transducer of claim 1 wherein the power and vibration level signal is an A.C. voltage signal and wherein the wireless transducer further comprises a rectifier circuit to rectify the A.C. power and vibration level signal.

8. A fault detection system comprising:

a plurality of self-powered wireless transducers, each comprising:

a housing adaptable to monitor an external physical condition of an external structure;

an energy conversion source mounted within the housing to sense the external physical condition and create a power and characteristic signal in response to the external physical condition, the power and characteristic signal having a characteristic of the external condition;

a transmitter mounted in the housing and connected to the energy conversion source to receive the power and characteristic signal and transmit a monitoring signal;

wherein each self-powered wireless transducer transmits a signal having a distinct address;

a receiver and processor to receive each of the distinct transmissions from the plurality of self-powered wireless transducers and differentiate which self-powered wireless transducer produced each distinct transmission so as to determine a location of a fault detection;

an energy storage device and a energy level detector, the energy storage device is connected to the energy conversion source and the energy level detector is connected to the energy storage device, and wherein the energy storage device is capable of storing the power and characteristic signal at least until the energy level detector detects a predetermined energy level; and wherein the energy storage device is a capacitor, the capacitance of which is selected to set a pulse width of the monitoring signal such that a number of wireless transducers can each produce a unique monitoring signal, and the energy level detector comprises a voltage comparator having a hysteresis in which the monitoring signal is transmitted.

9. The fault detection system of claim 8 further comprising:

a transmitter circuit containing the transmitter and connected to the energy storage device and the energy level detector, the transmitter circuit being activated when the energy level detector detects the predetermined energy level which thus activates the transmitter in response thereto.

10. A method of detecting vibration faults comprising the steps of:

mounting a housing on a structure to be monitored so as to receive vibratory motion from the structure on at least a portion of the housing;

converting power within the housing as a result of receiving the vibratory motion into electrical energy;

storing the converted electrical energy at least until the stored energy reaches a predetermined level;

using a singe piezoelectric sensor located in the housing for both sensing the vibratory motion and as a sole source of power generation;

activating an RF transmitter when the stored energy reaches the predetermined level; and transmitting an RF signal indicative of a level of the sensed vibratory motion in the structure which the housing is mounted therein.

11. The method of claim 10 wherein the steps of transmitting an RF signal is further defined as transmitting an RF signal indicative of an RF transmitter's identity such that a receiver and a processor can identify the RF transmitter that transmitted that particular RF signal.

12. The method of claim 11 further comprising the steps of:

receiving the RF signal at a remote location; and processing the RF signal to determine a change in received vibratory motion in the structure being monitored.

13. The method of claim 12 further comprising the steps of:

displaying an indication of the RF transmitter's identify; and activating an alarm to indicate a fault condition.

14. The method of claim 12 wherein the steps of processing the RF signal is further defined as comparing past RF signals to a present RF signal and if a present RF signal increases in frequency beyond a predetermined limit, then activating an alarm to indicate that vibratory motion has increased in the structure and that preventive maintenance is required.

15. A wireless transducer comprising:

a housing adaptable to monitor a vibratory movement of an external structure;

a single piezoelectric sensor mounted within the housing to sense the vibratory movement and provide a power and vibration level signal in response to the vibratory movement; and a transmitter mounted in the housing and connected to the piezoelectric sensor to receive the power and vibration level signal and transmit a monitoring signal, the transmitter receiving power only from the piezoelectric sensor as a source of power.

16. The wireless transducer of claim 15 further comprising an energy storage device and a energy level detector, the energy storage device is connected to the piezoelectric sensor and the energy level detector is connected to the energy storage device, and wherein the energy storage device is capable of storing the rectified A.C. power and vibration level signal at least until the energy level detector detects a predetermined energy level.

17. The wireless transducer of claim 16 wherein the energy storage device is a capacitor, the capacitance of which is selected to set a pulse width of the monitoring signal such that a number of wireless transducers can each produce a unique monitoring signal, and the energy level detector comprises a voltage comparator having a hysteresis in which the monitoring signal is transmitted.

18. The wireless transducer of claim 16 further comprising a transmitter circuit containing the transmitter and connected to the energy storage device and the energy level detector, the transmitter circuit being activated when the energy level detector detects the predetermined energy level which thus activates the transmitter in response thereto.

19. The wireless transducer of claim 18 wherein the transmitter circuit comprises a transistor and a resonator connected to a base of the transistor to activate the transmitter at a desired frequency.

20. The wireless transducer of claim 18 wherein the transmitter circuit drains the energy storage device when activated until energy in the energy storage device falls below the predetermined energy level.

21. The wireless transducer of claim 15 wherein the transmitter is a radio frequency RF transmitter.

* * * * *